(No Model.)
J. W. & A. B. JORY.
GRAIN HEADER.
No. 252,776. Patented Jan. 24, 1882.
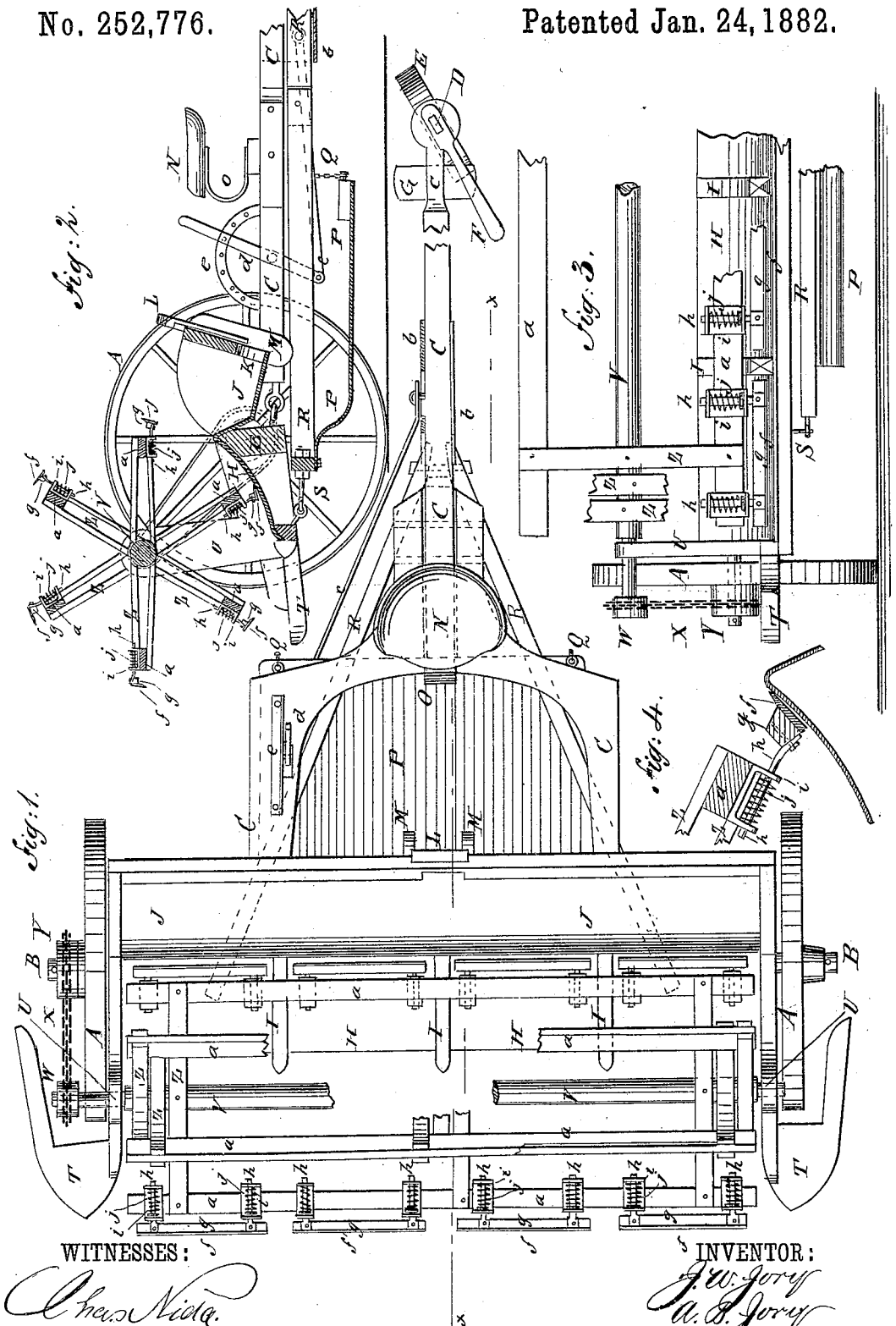
WITNESSES:
Chas. Nida.
C. Sedgwick.
INVENTOR:
J. W. Jory
A. B. Jory
BY
Munn & Co
ATTORNEYS.

UNITED STATES PATENT OFFICE.

JOHN W. JORY AND ARTHUR B. JORY, OF SALEM, OREGON.

GRAIN-HEADER.

SPECIFICATION forming part of Letters Patent No. 252,776, dated January 24, 1882.

Application filed October 24, 1881. (No model.)

*To all whom it may concern:*

Be it known that we, JOHN W. JORY and ARTHUR B. JORY, of Sa'em, in the county of Marion and State of Oregon, have invented certain new and useful Improvements in Grain-Headers, of which the following is a specification.

In the accompanying drawings, Figure 1 is a plan view of our improvement, parts being broken away. Fig. 2 is a sectional side elevation of the same, taken through the line $x\ x$, Fig. 1. Fig. 3 is a front elevation of part of the same.

Similar letters of reference indicate corresponding parts.

The object of this invention is to remove the heads of the grain and leave the whole of the stalks standing, however much the said stalks may vary in length.

The invention consists in the combination, with the reel-bars, the curved platform, and the receiving-box, of the lugged plates, the sliding rods and their springs, the knife-holding plates and the knives, whereby the grain will be cut from the stalks and deposited in the box; also, in the combination, with the wheels and axle, the tongue, the curved platform, and the movable frames, of the receiving-box having discharge-opening and gate, and the swinging platform, whereby the heads are received and can be readily sacked; and also in the combination, with the axle, the curved platform, and the tongue, of the movable frame, whereby the platform can be adjusted at any desired distance from the ground, as will be hereinafter fully described.

In the drawings, A are the wheels, and B is the axle, of the header. C is the tongue, which is made with a wide fork at its forward end, and is hinged at the ends of the branches of the said forked end to the rear side of the axle B.

To the rear end of the tongue C is swiveled the standard D, to the forked lower end of which is pivoted the small wheel E. To the upper end of the standard D is attached lever F, so that the standard D can be turned to turn the wheel E and guide the machine by the driver standing upon the platform G, attached to the rear part of the tongue C, or sitting upon a seat attached to the said rear part of the tongue.

To the axle B is attached a forwardly-projecting platform, H, which is curved in the arc of a circle having its center in the axis of the reel, hereinafter described. The upper side of the forward edge of the platform H is beveled, as shown in Fig. 2, to prevent the stalks from being cut by the first contact of the knives. The platform H is divided into sections by ribs I, attached to it, and which project in front to serve as fingers to separate the stalks of grain and guide the said stalks to the said sections.

To the rear side of the axle B is attached a box, J, to receive the heads of grain from the platform H. The rear edge of the platform H and the upper edge of the forward side of the box J meet at an angle, as shown in Fig. 2, so that the heads of grain will readily pass from the said platform into the said box. The platform H and box J can be formed of or lined with sheet metal, to prevent wear and form a smooth surface for the heads of grain to slide over.

In the lower part of the rear side of the receiving-box J is formed an opening, K, which is closed by a gate, L, sliding in rabbeted cleats M, attached to the said box, so that the heads of grain can be readily removed from the said box into sacks held beneath the said opening. The lower ends of the cleats M are widened, so that they will serve to keep the mouth of the sack open while being filled, and can be provided with inclined pins or hooks to hold the sack while receiving the grain-heads. The sacker can sit upon a seat, N, the standard O of which is attached to the tongue C, or to a bar or plate attached to the said tongue; or the sacker can stand upon a platform, P, suspended at its rear corners from the tongue C by flexible connections Q, and attached at its forward edge to the forward cross-bar of the frame R. The forward cross bar of the frame R is hinged at its center and ends by eyebolts S or other suitable means to the forward part of the frame of the platform H. The eyebolts of the central hinge are made adjustable by nuts or other suitable means, so that the cross-bar of the frame R will serve as a truss to strengthen the platform H against sagging. The side bars of the frame R incline toward each other, and to and between their rear ends is secured a single bar, which passes back beneath the tongue C and rests and slides in a keeper, $b$, attached to the said tongue. With this construction the axle B, tongue C, and frame R, having different axes, the forward and rearward movements of the frame R will raise and lower the forward edge of the platform H, rigidly attached to the said axle B, so that the machine can be so adjusted that the forward edge of the said platform will pass over weeds, stumps, and other obstructions.

To the rearward part of the sliding frame R is pivoted the end of a connecting-bar, c, the front end of which is pivoted to the lower end of the lever d. The lever d is centrally pivoted to the tongue C, and its upper end moves along an arched bar or plate, e, attached to the said tongue, and which has holes or teeth formed in it to receive a pin or other stop attached to the lever d to hold the sliding frame R and the platform H in any position into which they may be adjusted.

To the ends of the platform H are attached fingers T, which project in front of the said platform, and are made in hook form, or have arms attached to their outer sides, which project to the rearward at the outer sides of the wheels A, so that the said hook-fingers will serve as dividers to separate the stalks in front of the wheels, and as guides to bring the stalks within the sweep of the end parts of the reel.

To the end parts of the frame of the platform H are attached the lower ends of the reel posts or standards U, in bearings in the upper ends of which revolve the journals of the reel-shaft V. To one end of the reel-shaft V is attached a chain-wheel, W, around which passes an endless chain, X. The chain X also passes around a chain-wheel, Y, formed upon or attached to the hub of the drive-wheel A, so that the reel will be operated by the advance of the machine.

To the reel-shaft V are attached the reel-arms Z, to the outer ends of which are attached the reel-bars a. The reel V Z a is made heavier and stronger than ordinary reels, to adapt it to carry the cutters f, which are attached to the outer edges of the plates g. The cutters f and plates g are made in sections of such a length as to pass between the ribs I of the platform H. The inner sides of the forward edges of the cutters or knives f are deeply beveled, and the outer sides of the said edges are slightly beveled, so that the said cutting-edges will slide along the grain-stalks without cutting them, but will cut off the head of the said stalks as soon as the said heads are reached. Each knife-holding plate g is attached to the outer ends of two rods, h, which outer ends are bent to the rearward, so that the plates g will be nearly in a vertical position when they reach the rear edge of the curved platform H, to cause the grain-heads to fall into the box J, instead of being carried up by the said plates g and allowed to fall back upon the said platform H. The inner parts of the rods h pass through perforated lugs formed upon the outer and inner edges of the plates i, attached to the reel-bars a. The plates i are slotted to receive the bolts that fasten them to the reel-bars a, so that the said plates can be moved out and in by loosening the said fastening-bolts to cause the knives f to work closer to or farther from the platform H.

j are spiral springs, placed upon the rods h between the lugs of the plates i, the forward ends of the said springs resting against the outer lugs of the said plates, and their inner ends resting against collars, pins, or other stops attached to the rods h near the inner lugs of the said plates, so that should the knives f strike an object they cannot cut, the said knives can yield and pass the said object, and will thus be protected from being broken.

Having thus fully described our invention, we claim as new and desire to secure by Letters Patent—

1. In a grain-header, the combination, with the reel-bars a, the curved platform H, and the receiving-box I, of the lugged plates i, the rods h and their springs j, the knife-holding plates g, and the knives f, substantially as herein shown and described, whereby the grain-heads will be cut from the stalks and deposited in the box, as set forth.

2. In a grain-header, the combination, with the wheels and axle A B, the tongue C, the curved platform H, and the frame R, of the receiving-box J, having opening K and gate L, and the swinging platform P, substantially as herein shown and described, whereby the heads are received and can be readily sacked, as set forth.

3. In a grain-header, the combination, with the axle B, the curved platform H, and the hinged tongue C, provided with the keeper b, of the hinged frame R and means for sliding the same forward and backward in the said keeper, substantially as herein shown and described, whereby the front edge of the platform can be adjusted at any desired distance from the ground, as set forth.

JOHN W. JORY.
ARTHUR B. JORY.

Witnesses:
DAVID EARLY,
JAMES COFFEY.